United States Patent Office 3,320,440
Patented May 16, 1967

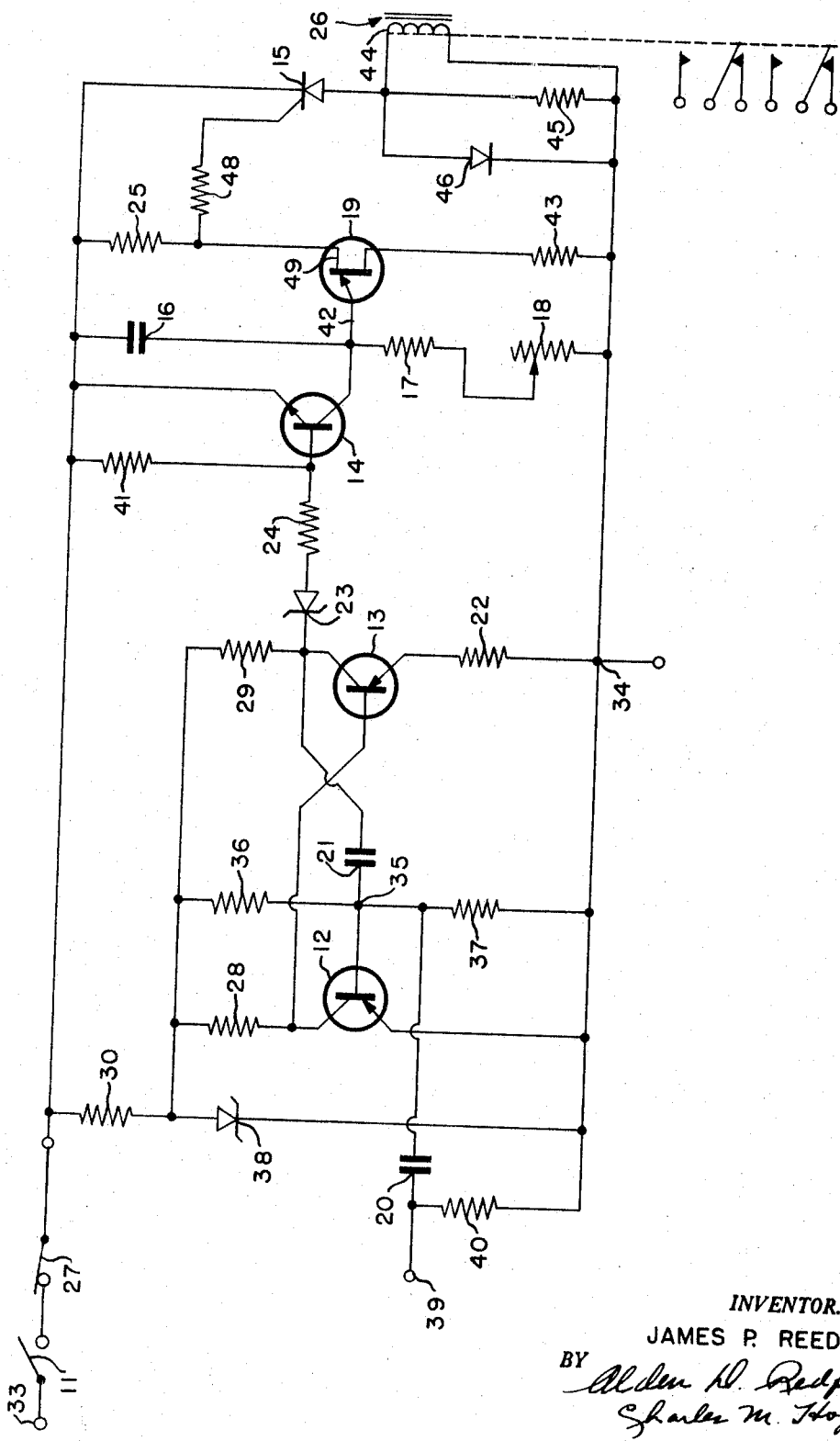
May 16, 1967 — J. P. REED — 3,320,440
SOLID STATE EVENT MONITORING DEVICE
Filed July 9, 1963
INVENTOR.
JAMES P. REED

3,320,440
SOLID STATE EVENT MONITORING DEVICE
James P. Reed, Clinton, Iowa, assignor to Avco Corporation, Cincinnati, Ohio, a corporation of Delaware
Filed July 9, 1963, Ser. No. 293,696
1 Claim. (Cl. 307—88.5)

The present invention relates to indicating or alarm circuits, and it provides a novel circuit for furnishing an indication that a second event has failed to follow the occurrence of a first event within a prescribed time interval.

The primary object of the invention is, therefore, to provide novel circuitry for signaling that an event has not followed a preceding event within a predetermined interval.

Another object of the invention is to provide the combination of a resistance-capacitance charging network, a first electronic relay device which is actuated to discharge the capacitance in that network, and a second electronic discharge device which is actuated by a voltage occurring in said network to discharge said capacitance if the first-mentioned relay device is not actuated.

A further object of the invention is to provide a monitoring device incorporating this double-discharge-control feature.

The present monitoring device was created in order to provide a check on the progress of various events occurring in a computer system. The computer includes means for indicating to my novel monitor that the computing system is progressing in performance of the instructions given to it. Any instruction or group of instructions given to the computing system are here arbitrarily referred to as the "first event." A second event, i.e., some indication of a step of progress in performing said instruction or instructions, should follow the first event by a predetermined time. In the particular case under discussion, the occurrence of the second event is indicated by a recycling pulse. If, due to malfunctioning of the computer system or an error, the second event does not occur within a reasonable period of time, the monitoring device, in accordance with the present invention, provides means for activating an alarm, thus indicating abnormal computer operation or malfunction.

For a better understanding of the present invention, together with other and further objects, advantages and capabilities thereof, reference is made to the following description of the appended drawing, the single figure of which is a circuit schematic of a preferred solid state event-monitoring device in accordance with the invention.

It will be observed that the principal elements of my monitoring device comprise a monostable multivibrator including transistors 12 and 13, a resistance-capacitance time constant circuit 16, 17 and 18, a first electronic relay 14 for discharging the capacitor, a second electronic relay 19, and a silicon controlled rectifier switch 15.

The parameters herein mentioned are furnished by way of illustration and not limitation, and it will be understood that the invention is not limited thereto.

The monostable circuit comprising transistors 12 and 13 (each PNP, type 3750) will be recognized as of per se conventional character, the collector of transistor 12 being directly connected to the base of transistor 13, and the collector of transistor 13 being coupled, as by capacitor 21, to the base of transistor 12. The transistors 12 and 13 are provided with collector load resistances 28 and 29, respectively, and these are connected to a dropping resistor 30, which in turn, is connected through normally closed relay contacts 27 and normally open relay contacts 11 to the negative terminal 33 of a suitable current source (not shown), the positive terminal of which is grounded and therefore effectively connected to point 34.

The base of transistor 12 is connected to point 35 of a voltage dividing network comprising resistors 36 and 37. Emitter resistor 22 is connected between the emitter of transistor 13 and ground.

For protective purposes, a rectifier 38 is connected in series with dropping resistor 30: (CR 1, 6 volts). The elements 30 and 38 are optional and can be eliminated when higher voltage rated transistors are used for elements 12 and 13.

A recycling pulse network comprises imput terminal 39, shunt resistor 40, and capacitor 20, the latter being connected to the base of transistor 12.

Proceeding now to the improved features with which the invention is primarily concerned, the collector output circuit of transistor 13 is coupled, via rectifer 23 (CR 2, 9 volts) and resistor 24 to the base of transistor 14 (NPN, Type 2N657). This transistor 14 is effectively a first relay in that capacitor 16 is connected between its collector and emitter in such fashion that when the transistor becomes conductive capacitor 16 discharges therethrough.

The base of transistor 14 is connected to negative terminal 33 via resistor 41.

The unijunction transistor 19 (Type 2N1671A) is arranged so that the P material is connected by line 42 to the collector of transistor 14 and the two N material connections are as follows: one via resistance 25 to the negative terminal and one via resistance 43 to ground. The coil 44 of relay 26 is shunted by a resistor 45 and a diode 46 (Type 1N538) and this coil is connected in a series circuit comprising ground, rectifier 15 and terminal 33, resistor 48 being connected between 49 of unijunction transistor 19 and rectifier 15.

It will be observed that resistance 25 and the unijunction transfer circuit involving elements 49 and 42 constitutes a second relay or discharge path for capacitor 16.

Reiterating that it is not intended to limit the invention to the specific illustrative parameters herein disclosed, the following have been found proper in one successful embodiment of the invention:

Resistance 30—6 volt dropping resistor.
Resistance 40—470 ohms.
Resistance 28—2200 ohms.
Resistance 36—15,000 ohms.
Resistance 37—33,000 ohms.
Resistance 29—1000 ohms.
Resistance 22—68 ohms.
Resistance 24—560 ohms.
Resistance 41—2200 ohms.
Resistance 17—180,000 ohms.
Rheostat 18—100,000 ohms maximum.
Resistance 25—27 ohms.
Resistance 48—330 ohms.
Resistance 43—120 ohms.
Resistance 45—680 ohms, 1 watt.
Rectifier 15—Type C5B.
Rectifier 46—Type 1N538.
Capacitor 20—270 micromicrofarads.
Capacitor 21—2 microfarads.
Capacitor 16—100 microfarads, 20 volts.

Initially, transistor 12 conducts, transistors 13 and 14 and silicon controlled rectifier switch 15 are nonconducting and capacitor 16 begins to charge through resistors 17 and 18. The values of capacitor 16 and resistors 17 and 18 are so selected that the peak point voltage of transistor 19 will be reached in from ten to seventeen seconds as determined by the setting of rheostat 18.

If an input signal in the form of a 55 microsecond pulse is received from the computer circuitry before the charge on capacitor 16 reaches the peak point voltage of transistor 19, the timing period of the device herein featured will be reset. The recycling pulse is applied to the base of transistor 12 through capacitor 20, whereupon normal monostable multivibrator operation occurs with transistor 12 turning off and transistor 13 turning on. Transistor 13 will conduct for a period determined by the time constant of capacitor 21 and resistance 22. The change at the collector of transistor 13 is applied to the base of transistor 14 through diode 23 and resistor 24, causing transistor 14 to conduct. Transistor 14, in turn, presents a low impedance path through which capacitor 16 discharges. The time constant in the monostable multivibrator is selected so that transistor 14 will be conductive sufficiently long to fully discharge capacitor 16 under the most adverse assumed conditions (as when the charge on capacitor 16 is just below the peak voltage of transistor 19). In the particular example under discussion the discharge path is provided for approximately 20 milliseconds.

When the monostable multivibrator returns to its stable state, with transistor 12 on, and transistor 13 off, transistor 14 ceases to conduct and capacitor 16 again begins to charge through resistor 17 and rheostat 18, restarting its time cycle.

If a recycle pulse is not received within the time period established by capacitor 16, resistor 17 and rheostat 18, the charge on capacitor 16 will reach the peak point voltage of transistor 19, the capacitor will discharge through the emitter-B1 junction of transistor 19 and a pulse will be produced across resistor 25. This pulse is coupled to the gate of silicon controlled rectifier 15, triggering it into conduction. Rectifier 15 then provides a current path which operates a relay 26, which is provided with suitable contacts to activate alarm circuits. Rectifier 15 will remain in a conducting state until either the contacts 11 or 27 are opened.

Thus it will be seen that in accordance with the invention there is provided the combination of a storage capacitor 16, a resistance 17, 18 in series with said storage capacitor and forming therewith a resistance-capacitance network adapted to be connected to an energy source (i.e. between 33 and 34) for charging; a first transistor 14 having a normally nonconductive circuit in shunt with that capacitor; means (comprising the monostable circuit) for controlling the first transistor 14 to discharge the capacitor 16; a second transistor 19 having a normally nonconductive circuit (including 42 and 49) in shunt with said capacitor, said transistor including an element (designated by the arrow) biased by said capacitor in such manner as to render the lastmentioned circuit conductive to discharge the capacitor 16 when the voltage across that capacitor reaches a predetermined limit.

It will be understood that relay contacts 11 are closed when the computer is put in operation to apply power to the circuitry.

While there has been shown and described what is at present considered to be the preferred embodiment of the invention, it will be understood by those skilled in the art that various modifications and changes therein may be made without departing from the true scope of the invention. For example, the voltage at terminal 33 in one successful embodiment is minus 12 volts, but this voltage is not a limitation on the invention. Further, the rectifier 23 may be dispensed with when transistors with a higher voltage rating than Type 3750 are used. From one point of view, the transistors 14 and 19 effectively constitute relays, one controlled by the monostable circuit to discharge storage capacitor 16, the other controlled by the resistance-capacitance circuit 16, 17, 18 to discharge the storage capacitor 16.

I claim:

A circuit for indicating failure of a second event to occur within a predetermined time following the occurrence of a first event comprising:

a current supply circuit including a source of current and a switch adapted to be closed to signify the occurrence of a first event;

a monostable device adapted to be coupled to said current supply circuit, said monostable device being adapted normally to assume a stable state when said switch is closed, said monostable device having an output and also an input to which input a recycling pulse is applied to signify the occurrence of the second event and to trigger the monostable device into a quasi-stable state;

a first switching transistor adapted to be energized by said current supply circuit and having a base and an emitter-collector circuit, said base being coupled to the output of said monostable device whereby the emitter-collector circuit of said transistor is nonconductive when the monostable device is in its stable state but conductive when the monostable device is in its quasi-stable state;

a resistance-capacitance time constant circuit including a resistor and a capacitor connected in series to said current supply circuit, said capacitor being connected across the emitter-collector circuit of the first switching transistor whereby the capacitance is charged when the first switching transistor is nonconductive and the monostable device is in its stable state and whereby the capacitor is discharged when the first switching transistor is conducting and the monostable device is in its quasi-stable state;

a second switching transistor of the unijunction type having an emitter connected to said capacitor to be biased thereby and a two-base switching circuit across said capacitor, said second switching transistor having a threshold of conductivity and being biased into conductivity by said capacitor to discharge said capacitor in the event that a recycling pulse fails to be applied to the bistable device within a predetermined time following the occurrence of the first event, and means including a silicon-control rectifier having a rectifying circuit connected to said energy source and a control element coupled to said second switching transistor for supplying an alarm when said second switching goes into conductivity, the quasi-stable state of said monostable device being sufficiently long to assure full discharge of the capacitor.

References Cited by the Examiner

UNITED STATES PATENTS

| | | | |
|---|---|---|---|
| 2,847,565 | 8/1958 | Clapper | 328—120 |
| 3,075,136 | 1/1963 | Jones | 307—88.5 |
| 3,162,772 | 12/1964 | Smith | 307—88.5 |
| 3,192,466 | 6/1965 | Sylvan et al. | 307—88.5 |
| 3,219,910 | 11/1965 | Klimo | 307—88.5 |
| 3,233,118 | 2/1966 | Jensen | 328—120 |

MALCOLM A. MORRISON, *Primary Examiner.*